(12) United States Patent
Murphy et al.

(10) Patent No.: US 10,913,611 B2
(45) Date of Patent: Feb. 9, 2021

(54) CONVEYOR APPARATUS FOR A TRAILED SPREADER

(71) Applicant: AGRI-SPREAD, Ballyhaunis (IE)

(72) Inventors: David Murphy, Ballyhaunis (IE); Dermot Murphy, Ballyhaunis (IE)

( * ) Notice: Subject to any disclaimer, the term of this patent is extended or adjusted under 35 U.S.C. 154(b) by 0 days.

(21) Appl. No.: 16/321,031

(22) PCT Filed: Jul. 27, 2017

(86) PCT No.: PCT/IB2017/054580
§ 371 (c)(1),
(2) Date: Jan. 27, 2019

(87) PCT Pub. No.: WO2018/020461
PCT Pub. Date: Feb. 1, 2018

(65) Prior Publication Data
US 2019/0168969 A1     Jun. 6, 2019

(30) Foreign Application Priority Data

Jul. 29, 2016   (GB) .................................. 1613178.1

(51) Int. Cl.
| B65G 23/44 | (2006.01) |
| B65G 23/06 | (2006.01) |
| B65G 15/42 | (2006.01) |
| B65G 15/20 | (2006.01) |
| B60P 1/38  | (2006.01) |

(52) U.S. Cl.
CPC ................ *B65G 23/44* (2013.01); *B60P 1/38* (2013.01); *B65G 15/20* (2013.01); *B65G 15/42* (2013.01); *B65G 23/06* (2013.01); *B65G 2201/04* (2013.01)

(58) Field of Classification Search
CPC ........ B65G 23/44; B65G 23/06; B65G 15/20; B65G 15/42; B60P 1/38
USPC .................................................. 198/834, 835
See application file for complete search history.

(56) References Cited

U.S. PATENT DOCUMENTS

| 4,685,557 A * | 8/1987 | Roinestad .............. | B65G 23/06 |
| | | | 198/834 |
| 5,190,146 A * | 3/1993 | Valster ................... | B65G 39/02 |
| | | | 198/842 |
| 5,452,791 A * | 9/1995 | Morency ................ | B65G 23/36 |
| | | | 198/813 |
| 5,630,500 A * | 5/1997 | Conrad .................. | B65G 15/42 |
| | | | 198/833 |
| 6,099,427 A * | 8/2000 | Brown ................... | B65G 23/06 |
| | | | 198/498 |
| 6,971,509 B2 * | 12/2005 | Ertel ...................... | B65G 21/06 |
| | | | 198/813 |
| 7,070,042 B2 * | 7/2006 | Dow ....................... | B65G 23/04 |
| | | | 193/37 |
| 7,210,573 B2 * | 5/2007 | Mol ........................ | B65G 15/42 |
| | | | 198/847 |
| 8,464,862 B2 * | 6/2013 | Honeycutt .............. | B65G 15/42 |
| | | | 198/822 |

(Continued)

*Primary Examiner* — Douglas A Hess
(74) *Attorney, Agent, or Firm* — Edwin Tarver (57) ABSTRACT

A conveyor apparatus comprising an elongated endless flexible conveyor belt having a moulded ridged conformation on its inner surface mounted between a drive roller drum and a take up roller drum, two elongated conveyor side plates and a plurality of idle conveyor rollers, wherein the diameter of the drive roller drum and the take up roller drum is uniform throughout their length.

16 Claims, 7 Drawing Sheets

(56) References Cited

U.S. PATENT DOCUMENTS

| | | | | |
|---|---|---|---|---|
| 8,544,632 B2* | 10/2013 | Gillet | ............... | B65G 17/44 |
| | | | | 198/465.2 |
| 8,662,132 B2* | 3/2014 | Cormier | ............... | A01D 61/002 |
| | | | | 156/443 |
| 9,327,907 B1* | 5/2016 | Schiltz | ............... | B65G 39/07 |
| 9,682,646 B2* | 6/2017 | Hazelton | ............... | A01B 71/08 |
| 9,850,072 B2* | 12/2017 | Lucchi | ............... | B08B 3/022 |
| 10,053,294 B2* | 8/2018 | DeGroot | ............... | B65G 15/42 |
| 10,486,908 B2* | 11/2019 | Adomaitis | ............... | A47J 37/045 |

* cited by examiner

CONVEYOR APPARATUS FOR A TRAILED SPREADER

INTRODUCTION

The present invention relates to a conveyor apparatus for trailed spreaders for the precision spreading of fertilisers.

Conventionally in most countries when spreader machine manufacturers manufacture a spreader for precision spreading they use a belt system for the conveyor mechanism. A belt conveyor system has a mechanism where the belt is tracked. If the manufacturer is making a spreader for bulk products that can be very wet and difficult to spread, they use a chain floor feed mechanism. However, while a chain floor feed mechanism is designed to illuminate belt/conveyor slippage, it adds the added issues of mechanical chain wear, chain lubrication and the issue of corrosion and general wear as opposed to a belt and drum system which does not have these issues.

There is a need for an improved conveyor apparatus which overcomes the problems of known conveyors.

STATEMENTS OF INVENTION

According to the invention there is provided a conveyor apparatus comprising;
 an elongated endless flexible conveyor belt having a moulded ridged conformation on its inner surface mounted between a drive roller drum and a take up roller drum;
 two elongated conveyor side plates; and
 a plurality of idle conveyor rollers;
wherein the diameter of the drive roller drum and the take up roller drum is uniform throughout their length.

In one embodiment of the invention the drive roller drum and take up roller drum comprise an inner cylindrical drum with annular end caps or plates. Preferably a series of fixed cylindrical rods extend between the outer edges of the annular end caps or plates. Most preferably the fixed cylindrical rods extend substantially parallel to each other.

In one embodiment of the invention the inner cylindrical drum comprises a number of annular plates along its length.

In one embodiment of the invention the moulded ridged conformation on the inner surface of the conveyor belt engages and interlocks with the cylindrical rods on the drive roller and take up roller drum.

In one embodiment of the invention the drive roller and take up roller are mounted between the elongated conveyor side plates and a series of idle conveyor rollers are mounted at spaced apart intervals between the conveyor side plates along the length of the conveyor to support the conveyor belt.

In another embodiment of the invention the conveyor apparatus comprises two elongated endless flexible conveyor belts each mounted between a drive roller drum and a take up roller drum wherein the two drive roller drums and the two take up roller drums are connected. Preferably the take up roller drums and drive roller drums are synchronised.

In one embodiment of the invention the take up roller drums are supported within a base framework comprising a base plate, a central guide plate, two take up units attached at each end of the base plate with a drive shaft extending between the two take up units. Preferably the central guide plate comprises an elongated aperture supporting a circular bearing connecting the two take up roller drums. Most preferably the circular bearing is attached by means of a threaded bar to a tension plate.

In one embodiment of the invention the conveyor apparatus comprises a split drum take up support positioned between the two drive roller drums.

In one embodiment of the invention the drive roller and take up roller are manufactured from a steel material.

According to the invention there is provided use of the conveyor apparatus of the invention in a trailed spreader.

BRIEF DESCRIPTION OF THE INVENTION

The invention will be more clearly understood from the following description thereof with reference to the accompanying drawings in which:—

DETAILED DESCRIPTION

The spreading of fertiliser and lime is a huge task and the problem of belt slippage on trailed spreaders can cause a lot of problems. This is particularly the case with trailed bulk fertilizer or lime spreaders where any disruption in spreading can have huge commercial impact.

Conveyor systems are well known and used in many industries to aid in the progressive movement of material from one place to another. However, the conveying of different materials can cause different problems such as slippage with wet material and/or damage to the conveyor system causing it to jam etc. Problems with conveyor mechanisms can lead to major issues in efficiency and reliability.

Particularly problematic with agricultural systems is an accumulation of wet material between the drive roller and the flat belt that can lead to extensive slipping. This problem is aggravated by the fact that the wet material also has a tendency to adhere to the belts and rollers. The coefficient of friction between the drive roller and the flat belt can be severely impacted.

All belt conveyor systems have a mechanism wherein the belt is tracked. This consists of tensioning the belt on either side and manufacturing the drive drum and take up drums with a taper. The drums are higher, have a larger diameter, in the middle than on both ends to try and drive the belt to the middle keeping the belt tracked and from drifting to the side.

On many conventional belt conveyor systems, the belt is kept from slipping by putting the belt under very high tension.

The correct tensioning and/or tracking of conveyor belts is essential for optimum efficiency on conveyors systems. Too much tension can result in very 'nervous' belt behaviour and excessive wear of machinery components like bearings and shafts. Too much tension can also result in a breaking of the shafts. Too little tension gives belt slippage on the drive drum. All these problems result in a shorter service life and increased maintenance costs.

The present invention provides a positive drive conveyor mechanism which consistently maintains the coefficient of friction necessary to maintain a positive drive on a conveyor mechanism. The positive drive conveyor apparatus of the invention essentially eliminates any slippage of the conveyor occurring and provides a more reliable and efficient conveyor apparatus. Having a positive drive means the belt on the conveyor mechanism is not required to be under as much tension which prolongs the life of the belt and all other parts of the mechanism such as bearings are not put under as much pressure.

Figure 1:
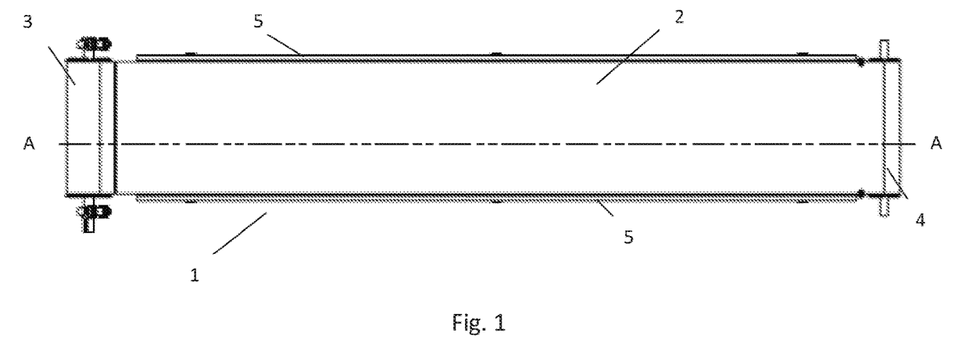
FIG. 1 is a plan view from the top of the conveyor apparatus of the invention.
Figure 2:
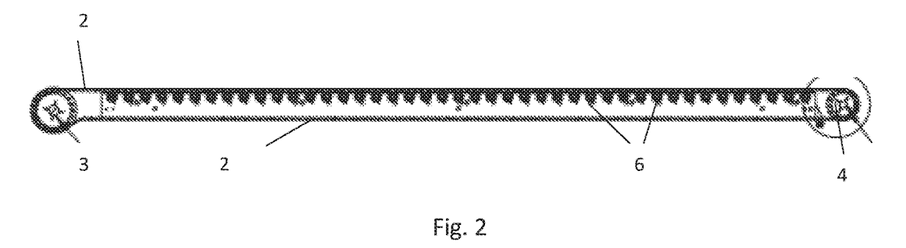
FIG. 2 is a cross sectional view taken along the line A-A of FIG. 1.
Figure 6:
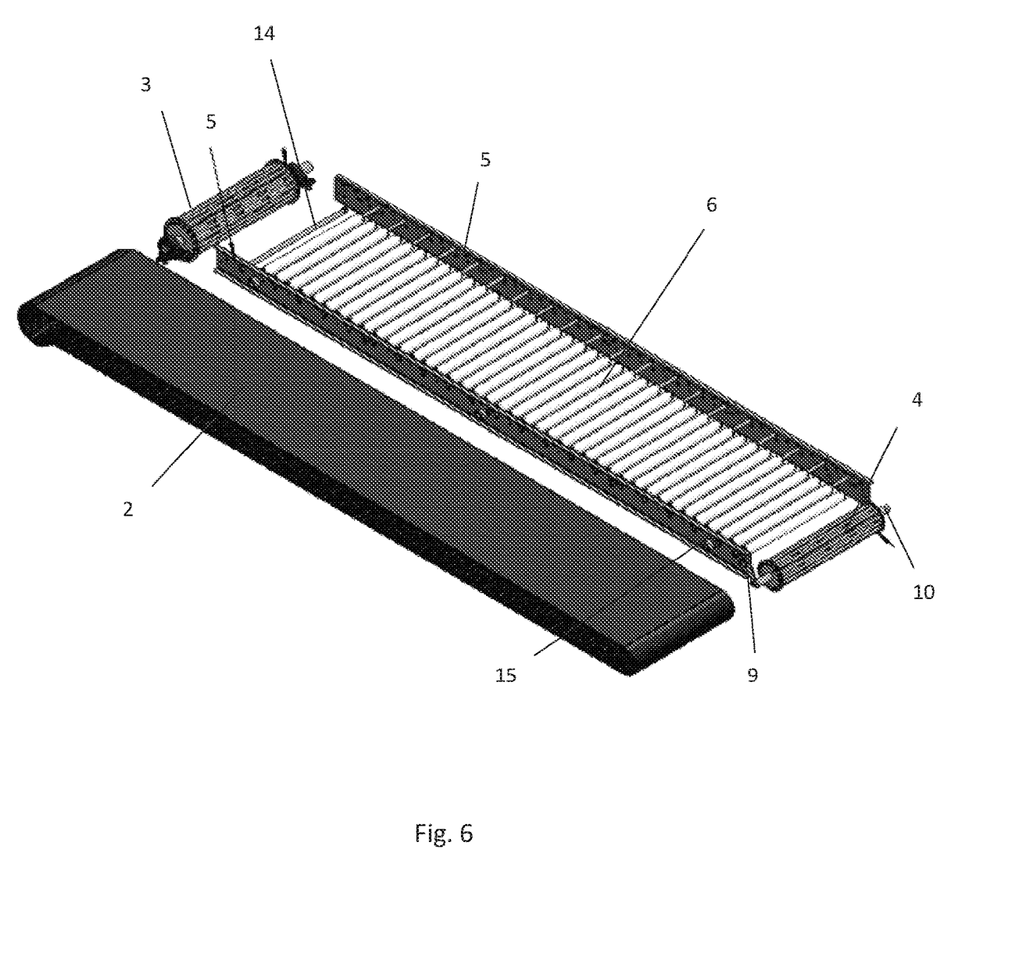
FIG. 6 is an exploded view of the conveyor apparatus of the invention.
Figure 7:
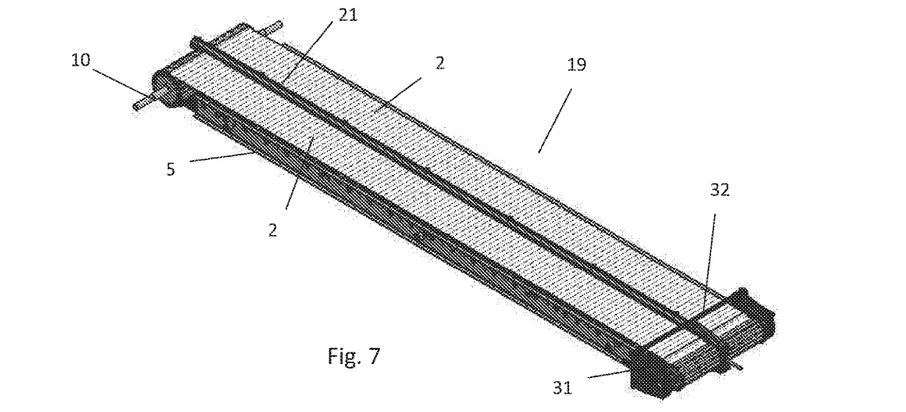
FIG. 7 is a perspective view of the dual conveyor apparatus according to another embodiment of the invention.
Figure 8:
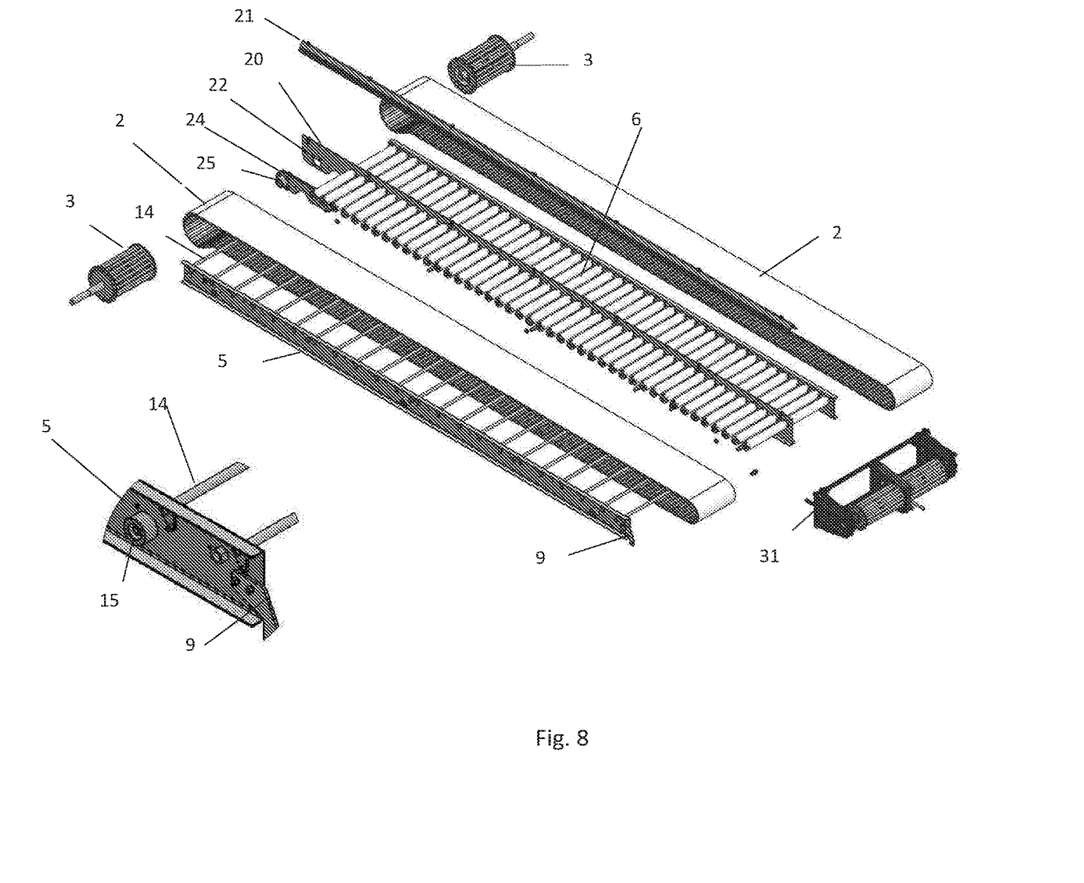
FIG. 8 is an exploded view of the conveyor apparatus of FIG. 7.
Figure 9:
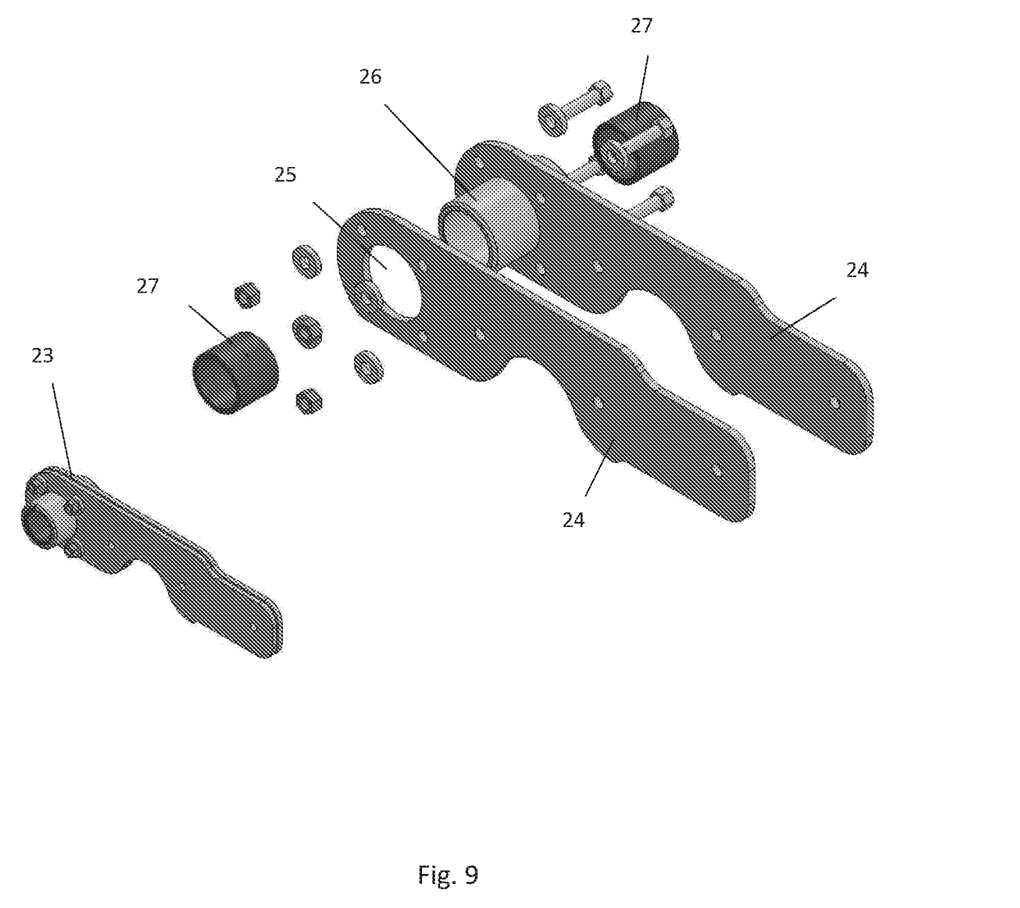
FIG. 9 shows a perspective view and exploded view of the split drum take up support on the apparatus of FIG. 7.

The conveyor apparatus 1 of the present invention comprises an elongated conveyor belt 2 mounted between a drive roller drum 3 and a take up roller drum 4. The drive roller 3 and take up roller 4 are mounted between two conveyor side plates 5 at opposite ends of the conveyor side plates 5. A series of idle conveyor rollers 6 are mounted at uniformly spaced intervals between the conveyor side plates 5 and support the conveyor belt 2. Any number of idle rollers 6 may be used depending on the length of the conveyor belt and the spreader vehicle. Spacer rods 14 are positioned between the idle rollers. Conveyor guides 15 are positioned at intervals along the side of the conveyor side plates 5. The end of the conveyor side plates 5 adjacent the take up roller drum 4 has a conveyor securing plate 9.

Figure 3:
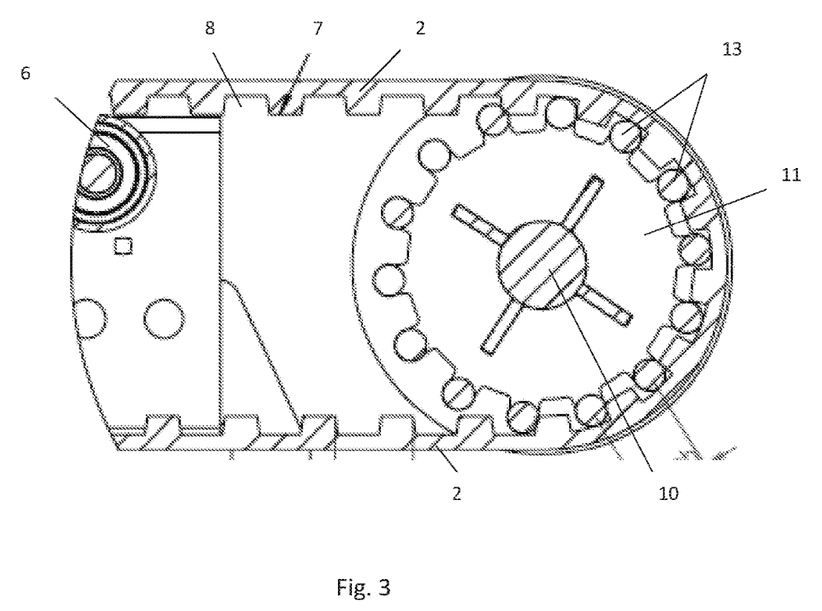
FIG. 3 is an exploded cross sectional view of the drive roller of the conveyor apparatus of the invention.
Figure 5:
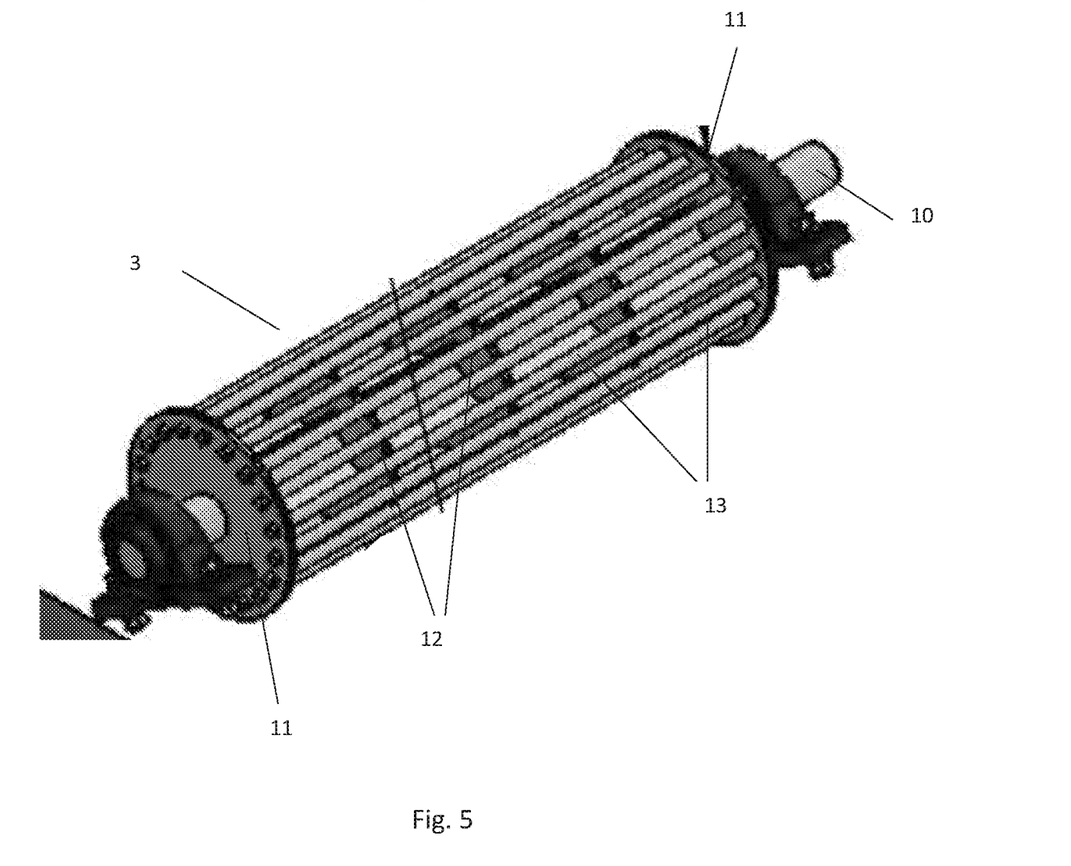
FIG. 5 is an enlarged perspective view of the drive roller on the conveyor apparatus of the invention.

The drive roller drum 3 and take up roller drum 4 comprise a rotating conveyor roller shaft 10 centrally positioned between two annular caps or end plates 11. The annular caps or end plates 11 reduces the wear and tear on the drums as they prevent the belt from drifting from side to side on the drums. A number of smaller annular plates 12 are positioned on the conveyor roller shaft 10 between the two annular end plates 11. A series of fixed cylindrical rods 13 extend between the outer edge/circumference of the annular end plates 11. The diameter of the roller drum 3, 4 is the same throughout the length of the drum. The roller drums provide a horizontal surface for the conveyor belt to rest on and engage with. The conveyor roller shaft 10 is connected to a conventional drive mechanism and operated by a hydraulic drive gearbox or mechanical cylindrical landdrive mechanism of the trailed vehicle. The essentially open design of the drive roller 3 and take up roller 4 allows material to pass through the cylindrical rods and prevents clogging.

Figure 4:
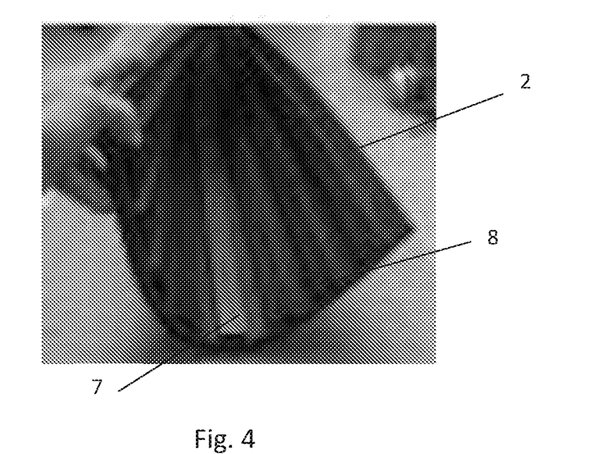
FIG. 4 is a perspective view of the moulded under-surface of the conveyor belt of the conveyor apparatus of the invention.

The under-surface of the conveyor belt 2 comprises a moulded ridged conformation comprising horizontal ridges 7 and U-shaped grooves 8 (FIG. 4) which engage tightly with the cylindrical rods 13 on the drive roller 3 and take up roller 4. The U-shaped grooves 8 on the under-surface of the conveyor belt 2 engage with the cylindrical rods 13 providing a drive resistance between the conveyor belt 2 and the drive 3 and take up roller 4. The engagement between the cylindrical rods 13 and the U-shaped grooves 8 on the underside of the conveyor belt 2 prevent slippage of the conveyor belt 2 on the rollers even in the wettest conditions.

The secure engagement between the conveyor belt 2 and the drive roller 3 and take up roller 4 maintains a positive drive resistance between the belt and the rollers. The positive drive means that the conveyor belt is not put under high tension in comparison to conventional belt conveyor systems. As it is not under the same tension the lifespan of the belt is significantly increased. The lifespan of other parts of the apparatus such as bearings and shafts is also improved.

The upper surface of the conveyor belt 2 may be smooth or textured depending on the material to be conveyed on the conveyor mechanism of the invention.

The conveyor apparatus of the present invention may comprise a dual conveyor system 19 with twin conveyor belts 2 as shown in FIGS. 7 to 11. In contrast to known twin belt systems the present invention provides a twin belt mechanism driven by a positive drive. For the reasons given hereinbefore for the single conveyor belt system the positive drive system on the dual conveyor system 19 provides a more efficient and dependable conveyor mechanism.

The dual drive roller system comprises two drive roller drums 3 separated by an elongated conveyor drive plate 20 which extends the length of the conveyor apparatus. A centre skirt 21 covers the upper surface of the elongated conveyor drive plate 20. The conveyor roller drive shaft 10 on each roller are connected to one another through a circular opening 22 in the drive plate. A split drum take up support 23 is located on one side of the drive plate. As shown in more detail in FIG. 9 the split drum take up support 23 has two flat elongated plate frames 24 with a circular opening 25 at the distal end for receiving a bushing plate 26 surrounding two spacers 27 connected on either side to the conveyor roller drive shaft 10 on each of the drive rollers 3.

The other end of the drive shaft on either of the drive rollers are connected to conveyor side plates 5 as for the single conveyor system.

Figure 10:
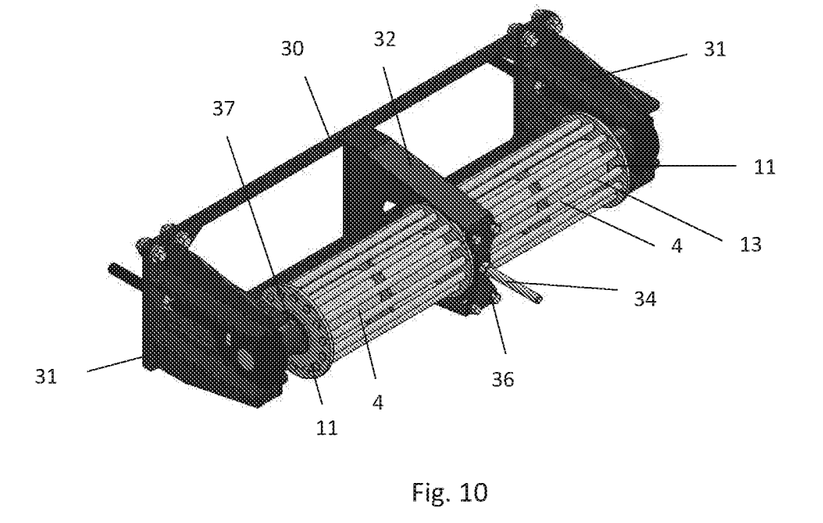
FIG. 10 a perspective view of the dual take up rollers on the apparatus of FIG. 7.
Figure 11:
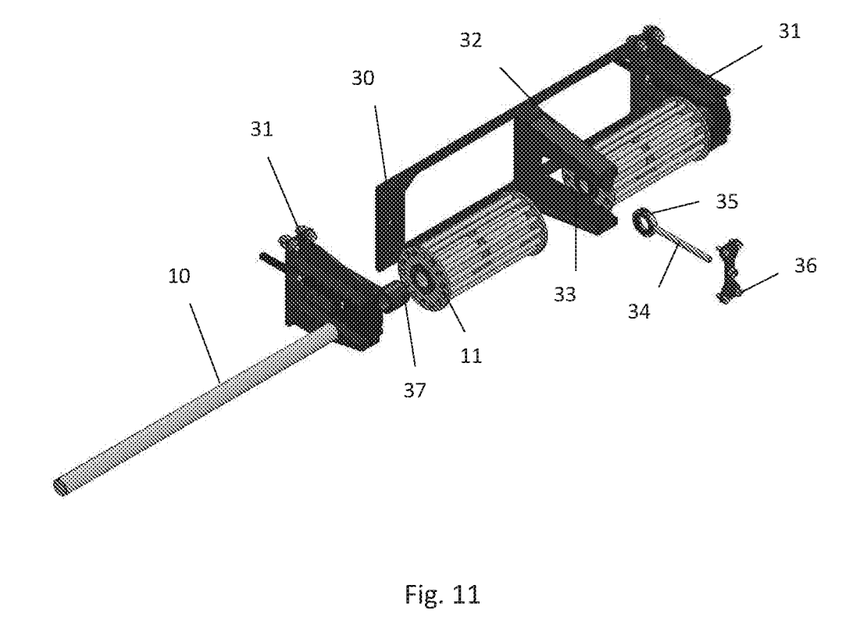
FIG. 11 is a partially exploded view of the dual take up rollers of FIG. 9.

The take up roller drums 4 on the twin belt system are supported within a framework having a base plate frame 30 with a take up unit 31 on either end extending substantially at a right angle to the base plate frame 30 (FIG. 10). A central guide plate 32 separates the two take up rollers 4. The central guide plate 32 has a central aperture 33 for receiving a threaded bar 34 with a spherical Igus® bearing 35 which engages with the conveyor roller shaft 10 on the first and second take up roller. The threaded bar is attached to a tension plate 36.

The take up unit 31 on either side of the base plate frame 30 has a spacer 37 which engages with either end of the conveyor roller shaft 10 and provides a gap between the take up unit 31 and the rollers 4.

The rollers are manufactured from a strong durable material such as steel.

The conveyor belt is a commercially available belt manufactured from any suitable material.

Figure 12:
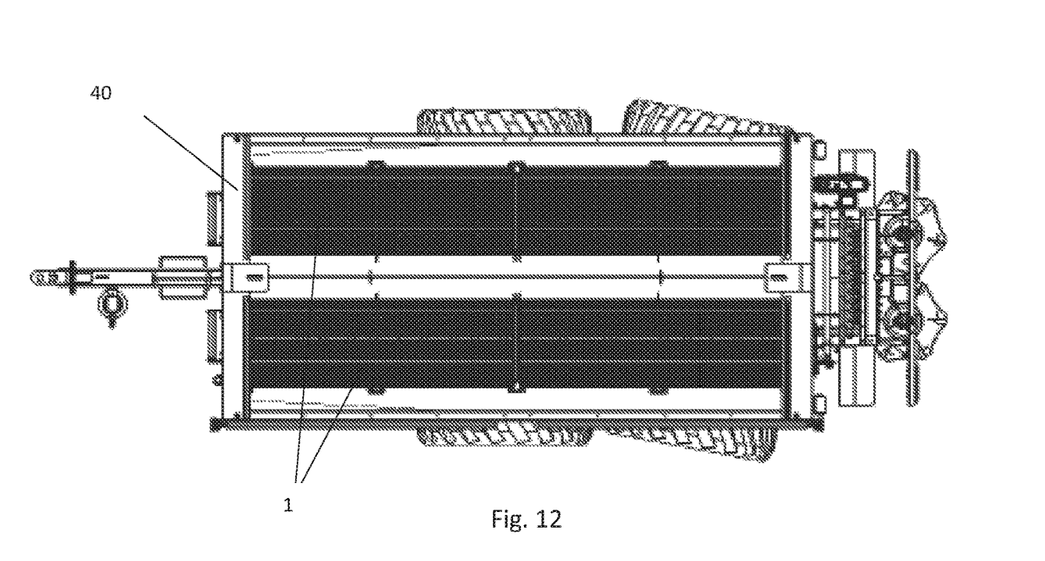
FIG. 12 is a plan view of the conveyor apparatus of the invention in situ in a trailed spreader.
Figure 13:
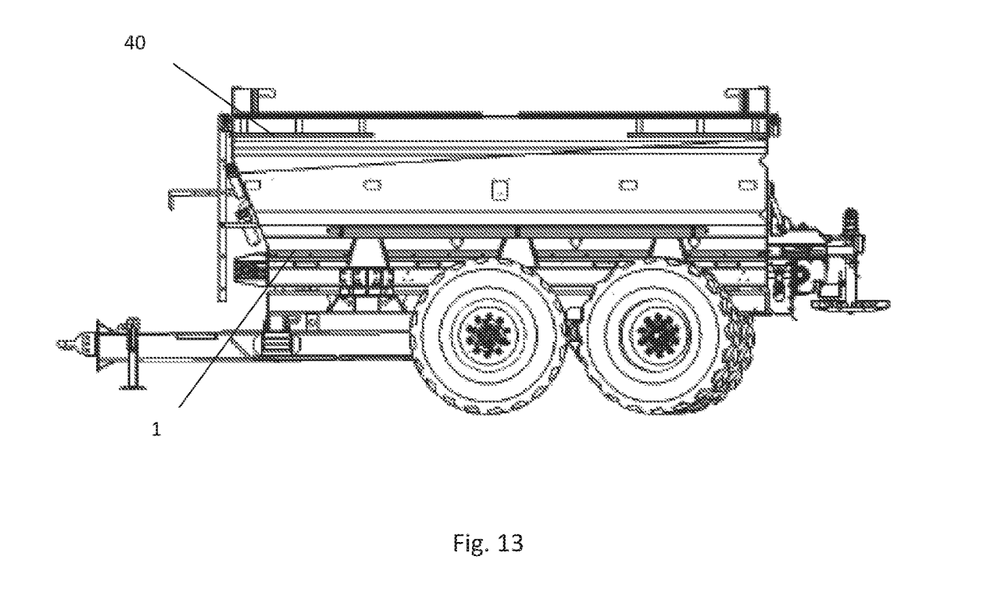
FIG. 13 is a side partially cross sectional view of the trailed spreader of FIG. 12.

The conveyor apparatus 1 of the present invention may be used in any type of trailed spreader. FIGS. 12 and 13 show a dual conveyor system with twin conveyor belts in a trailed spreader vehicle 40. The single and dual conveyor apparatus of the invention may however be used in any type of conveyor systems where a positive drive mechanism is required.

The invention is not limited to the embodiment hereinbefore described, with reference to the accompanying drawings, which may be varied in construction and detail.

The invention claimed is:

1. A conveyor apparatus comprising;
an elongated endless flexible conveyor belt having a molded ridged conformation on its inner surface mounted between a drive roller drum and a take up roller drum;
two elongated conveyor side plates; and
a plurality of idle conveyor rollers;
wherein the diameter of the drive roller drum and the take up roller drum is uniform throughout their length and wherein the drive roller drum and the take up roller drum comprise an inner cylindrical drum with annular end caps or plates comprising a series of fixed cylindrical rods extending between the outer edges of the annular end caps or plates and wherein a molded ridged conformation on the inner surface of the conveyor belt engages and interlocks with the cylindrical rods on the drive roller and take up roller drum.

2. The apparatus of claim 1 wherein the fixed cylindrical rods extend substantially parallel to each other.

3. The apparatus of claim 1 wherein the inner cylindrical drum comprises a number of annular plates along its length.

4. The apparatus of claim 1 wherein the drive roller and take up roller are mounted between the elongated conveyor side plates and a series of idle conveyor rollers are mounted at spaced apart intervals between the conveyor side plates along the length of the conveyor to support the conveyor belt.

5. The apparatus of claim 1 comprising two elongated endless flexible conveyor belts each mounted between a drive roller drum and a take up roller drum wherein the two drive roller drums and the two take up roller drums are connected.

6. The apparatus of claim 5 wherein the take up roller drums and drive roller drums are synchronised.

7. The apparatus of claim 5 wherein the take up roller drums are supported within a base framework comprising a base plate, a central guide plate, two take up units attached at each end of the base plate with a drive shaft extending between the two take up units.

8. The apparatus of claim 7 wherein the central guide plate comprises an elongated aperture supporting a circular bearing connecting the two take up roller drums.

9. The apparatus of claim 8 wherein the circular bearing is attached by means of a threaded bar to a tension plate.

10. The apparatus of claim 5 comprising a split drum take up support positioned between the two drive roller drums.

11. The apparatus of claim 1 wherein the drive roller drum and take up roller drum are manufactured from a steel material.

12. The apparatus of claim 1 wherein the apparatus is installed in a trailed spreader.

13. A conveyor apparatus comprising;
an elongated endless flexible conveyor belt having a moulded ridged conformation on its inner surface mounted between a drive roller drum and a take up roller drum;
two elongated conveyor side plates; and
a plurality of idle conveyor rollers;
wherein the diameter of the drive roller drum and the take up roller drum is uniform throughout their length;
wherein the drive roller drum and the take up roller drum comprise an inner cylindrical drum with annular end caps or plates;
wherein a series of fixed cylindrical rods extend between the outer edges of the annular end caps or plates;
wherein the fixed cylindrical rods extend substantially parallel to each other;
wherein the inner cylindrical drum comprises a number of annular plates along its length;
wherein a moulded ridged conformation on the inner surface of the conveyor belt engages and interlocks with the cylindrical rods on the drive roller and take up roller drum;
wherein the drive roller and take up roller are mounted between the elongated conveyor side plates and a series of idle conveyor rollers are mounted at spaced apart intervals between the conveyor side plates along the length of the conveyor to support the conveyor belt;
wherein two elongated endless flexible conveyor belts are each mounted between a drive roller drum and a take up roller drum wherein the two drive roller drums and the two take up roller drums are connected and synchronized.

14. The apparatus of claim 13, wherein the take up roller drums are supported within a base framework comprising a base plate, a central guide plate, two take up units attached at each end of the base plate with a drive shaft extending between the two take up units.

15. The apparatus of claim 13 wherein the central guide plate comprises an elongated aperture supporting a circular bearing connecting the two take up roller drums;
wherein the circular bearing is attached by means of a threaded bar to a tension plate;
wherein the apparatus comprises a split drum take up support positioned between the two drive roller drums; and
wherein the drive roller and take up roller are manufactured from a steel material.

16. The apparatus of claim 13 wherein the apparatus is installed in a trailed spreader.

* * * * *